US008655711B2

(12) United States Patent
Merrifield, Jr. et al.

(10) Patent No.: US 8,655,711 B2
(45) Date of Patent: Feb. 18, 2014

(54) LINKING ENTERPRISE RESOURCE PLANNING DATA TO BUSINESS CAPABILITIES

(75) Inventors: Eric S. Merrifield, Jr., Seattle, WA (US); Daniel C. Brown, Bellevue, WA (US); Chad K. Corneil, Snoqualmie, WA (US); David B. Appel, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1075 days.

(21) Appl. No.: 12/323,086

(22) Filed: Nov. 25, 2008

(65) Prior Publication Data
US 2010/0131330 A1    May 27, 2010

(51) Int. Cl.
*G06Q 10/00*    (2012.01)
(52) U.S. Cl.
USPC ............................................. 705/7.36
(58) Field of Classification Search
USPC ..................... 705/7.36, 7.37, 7.39
See application file for complete search history.

(56) References Cited

U.S. PATENT DOCUMENTS

| | | | |
|---|---|---|---|
| 5,233,513 A | 8/1993 | Doyle | |
| 5,799,286 A | 8/1998 | Morgan | |
| 5,953,707 A | 9/1999 | Huang | |
| 6,151,582 A | 11/2000 | Huang | |
| 6,321,205 B1 | 11/2001 | Eder | |
| 6,345,239 B1 | 2/2002 | Bowman-Amuah | |
| 6,560,569 B1 | 5/2003 | Abu El Ata | |
| 6,601,233 B1 | 7/2003 | Underwood | |
| 6,609,120 B1 | 8/2003 | Honarvar | |
| 6,772,216 B1 | 8/2004 | Ankireddipally | |
| 6,778,971 B1 | 8/2004 | Altschuler | |
| 6,873,979 B2 | 3/2005 | Fishman | |
| 6,876,993 B2 | 4/2005 | LaButte et al. | |
| 6,898,783 B1 | 5/2005 | Gupta | |
| 6,904,449 B1 | 6/2005 | Quinones | |
| 6,961,756 B1 | 11/2005 | Dilsaver | |
| 6,965,886 B2 | 11/2005 | Govrin et al. | |
| 7,043,454 B2 | 5/2006 | Powell | |
| 7,120,896 B2 | 10/2006 | Budhiraja | |
| 7,162,427 B1 | 1/2007 | Myrick | |
| 7,181,302 B2 | 2/2007 | Bayne | |
| 7,243,120 B2 | 7/2007 | Massey | |

(Continued)

FOREIGN PATENT DOCUMENTS

| | | |
|---|---|---|
| WO | 00/42553 | 7/2000 |
| WO | 01/06352 | 1/2001 |

OTHER PUBLICATIONS

Mathiassen, "Business agility and diffusion of information technology," 2006, European Journal of Information Systems, vol. 15, pp. 116-119.*

(Continued)

*Primary Examiner* — Stephanie Delich
(74) *Attorney, Agent, or Firm* — Workman Nydegger

(57) ABSTRACT

The present invention extends to methods, systems, and computer program products for linking enterprise resource planning data to business capabilities. Embodiments provide a linkage between schematized ERP data (e.g., financial data) and schematized business capabilities. The linkage provides the ability to report in a visual way that permits the linkage of such things as business value, performance, maturity, interconnectedness, process standardization, compliance, etc. As such, businesses capabilities can be linked to specific spend amounts in ERP data.

17 Claims, 10 Drawing Sheets

(56) References Cited

U.S. PATENT DOCUMENTS

| | | |
|---|---|---|
| 7,246,144 B2 | 7/2007 | Walsh |
| 7,251,613 B2 | 7/2007 | Flores |
| 7,281,235 B2 | 10/2007 | Datta |
| 7,308,414 B2 | 12/2007 | Parker |
| 7,308,417 B1 | 12/2007 | Nathan |
| 7,461,038 B2 | 12/2008 | Kropaczek et al. |
| 7,506,302 B2 | 3/2009 | Bahrami |
| 7,580,913 B2 | 8/2009 | Chandra et al. |
| 7,703,071 B2 | 4/2010 | Kuester |
| 2001/0053991 A1 | 12/2001 | Bonabeau |
| 2002/0013720 A1 | 1/2002 | Ozono |
| 2002/0049573 A1 | 4/2002 | El Ata |
| 2002/0059093 A1 | 5/2002 | Barton |
| 2002/0059264 A1 | 5/2002 | Fleming |
| 2002/0095393 A1 | 7/2002 | McHaney |
| 2002/0103869 A1 | 8/2002 | Goatly |
| 2002/0133368 A1* | 9/2002 | Strutt et al. ................ 705/1 |
| 2002/0138484 A1 | 9/2002 | Bialek |
| 2002/0184070 A1 | 12/2002 | Chen et al. |
| 2002/0186238 A1 | 12/2002 | Sylor |
| 2002/0198722 A1 | 12/2002 | Yuschik |
| 2002/0198727 A1 | 12/2002 | Ann |
| 2002/0198800 A1 | 12/2002 | Shamrakov |
| 2003/0033182 A1 | 2/2003 | Stok |
| 2003/0046123 A1 | 3/2003 | Chen |
| 2003/0065690 A1* | 4/2003 | Kelley ................ 708/100 |
| 2003/0083912 A1 | 5/2003 | Covington |
| 2003/0084053 A1 | 5/2003 | Govrin |
| 2003/0097286 A1 | 5/2003 | Skeen |
| 2003/0144858 A1 | 7/2003 | Jain et al. |
| 2003/0216955 A1 | 11/2003 | Miller |
| 2004/0034496 A1 | 2/2004 | Correll |
| 2004/0034615 A1 | 2/2004 | Thompson |
| 2004/0054690 A1 | 3/2004 | Hillerbrand |
| 2004/0068431 A1 | 4/2004 | Smith |
| 2004/0107124 A1 | 6/2004 | Sharpe |
| 2004/0138933 A1 | 7/2004 | LaComb |
| 2004/0143470 A1 | 7/2004 | Myrick |
| 2004/0153436 A1* | 8/2004 | Pope et al. ................ 707/1 |
| 2004/0172319 A1 | 9/2004 | Eder |
| 2004/0177326 A1 | 9/2004 | Bibko |
| 2004/0181538 A1 | 9/2004 | Lo |
| 2004/0230404 A1 | 11/2004 | Messmer |
| 2004/0236618 A1 | 11/2004 | Smith |
| 2004/0243595 A1 | 12/2004 | Cui |
| 2005/0021348 A1 | 1/2005 | Chan et al. |
| 2005/0021433 A1 | 1/2005 | Hyler |
| 2005/0027752 A1 | 2/2005 | Gelbard |
| 2005/0033716 A1 | 2/2005 | Ambroz |
| 2005/0033762 A1 | 2/2005 | Kasravi et al. |
| 2005/0043977 A1 | 2/2005 | Ahem |
| 2005/0049882 A1 | 3/2005 | Sawka |
| 2005/0065805 A1 | 3/2005 | Moharram |
| 2005/0071737 A1 | 3/2005 | Adendorff |
| 2005/0086189 A1 | 4/2005 | Noble |
| 2005/0091093 A1 | 4/2005 | Bhaskaran |
| 2005/0108022 A1 | 5/2005 | Bhattacharya |
| 2005/0119905 A1 | 6/2005 | Wong et al. |
| 2005/0149558 A1 | 7/2005 | Zhuk |
| 2005/0197969 A1 | 9/2005 | McElroy |
| 2005/0216320 A1 | 9/2005 | Hattaway |
| 2005/0222893 A1 | 10/2005 | Kasravi |
| 2005/0228688 A1 | 10/2005 | Visser |
| 2006/0005157 A1 | 1/2006 | Saxena |
| 2006/0064335 A1 | 3/2006 | Goldszmidt |
| 2006/0074833 A1 | 4/2006 | Gardner |
| 2006/0111921 A1 | 5/2006 | Chang |
| 2006/0116919 A1 | 6/2006 | Homann |
| 2006/0116922 A1* | 6/2006 | Homann et al. ........... 705/10 |
| 2006/0149764 A1 | 7/2006 | Burchfield |
| 2006/0155711 A1 | 7/2006 | Jackson |
| 2006/0167665 A1 | 7/2006 | Ata |
| 2006/0167704 A1 | 7/2006 | Nicholls et al. |
| 2006/0178928 A1 | 8/2006 | Carney |
| 2006/0206374 A1 | 9/2006 | Asthana |
| 2006/0224425 A1 | 10/2006 | Homann |
| 2006/0229922 A1 | 10/2006 | Levy |
| 2006/0229926 A1 | 10/2006 | Homann |
| 2006/0235732 A1 | 10/2006 | Miller et al. |
| 2006/0241954 A1 | 10/2006 | Jeng |
| 2006/0241956 A1 | 10/2006 | Levy |
| 2006/0242176 A1 | 10/2006 | Tsyganskiy |
| 2006/0247943 A1 | 11/2006 | Kapoor |
| 2006/0259316 A1 | 11/2006 | Breslin |
| 2006/0277156 A1 | 12/2006 | Merican |
| 2006/0293911 A1 | 12/2006 | Wittmann et al. |
| 2007/0008884 A1* | 1/2007 | Tang ..................... 370/230 |
| 2007/0016886 A1 | 1/2007 | O'Neil |
| 2007/0021992 A1 | 1/2007 | Konakalla |
| 2007/0022404 A1 | 1/2007 | Zhang |
| 2007/0043724 A1 | 2/2007 | Senan |
| 2007/0067195 A1 | 3/2007 | Fahner |
| 2007/0078702 A1 | 4/2007 | Tandon |
| 2007/0094288 A1 | 4/2007 | Enenkiel |
| 2007/0124184 A1 | 5/2007 | Schmidt |
| 2007/0129981 A1 | 6/2007 | Jang et al. |
| 2007/0130191 A1 | 6/2007 | Dawson |
| 2007/0143174 A1 | 6/2007 | Tien |
| 2007/0162496 A1 | 7/2007 | Pulfer |
| 2007/0174109 A1* | 7/2007 | Cohn et al. ............ 705/10 |
| 2007/0174840 A1 | 7/2007 | Sharma |
| 2007/0203589 A1 | 8/2007 | Flinn |
| 2007/0203718 A1 | 8/2007 | Merrifield |
| 2007/0203766 A1* | 8/2007 | Adler et al. ............ 705/7 |
| 2007/0226163 A1 | 9/2007 | Robles |
| 2007/0234277 A1 | 10/2007 | Lei |
| 2007/0250361 A1 | 10/2007 | Hazy |
| 2008/0004924 A1 | 1/2008 | Cao |
| 2008/0120573 A1 | 5/2008 | Gilbert |
| 2008/0201195 A1* | 8/2008 | Cohn et al. ............ 705/9 |
| 2008/0270448 A1 | 10/2008 | Brennan et al. |
| 2008/0313102 A1 | 12/2008 | Campo |
| 2009/0112655 A1 | 4/2009 | Stuhec |
| 2009/0158237 A1 | 6/2009 | Zhang et al. |

OTHER PUBLICATIONS

Plachy, "Enterprise Solutions Structure," 1999 IBM Systems Journal, vol. 38, No. 1, pp. 4-10.*
Ing. M.G. (Rine) le Comte BSc., "Business Processes and Workflow Management in an Enterprise Resource Planning Content", OOPSLA 1997, Atlanta, Business Object Workshop III, 5 pages.
Nayak, N., et al., IBM Systems Journal, "Core business architecture for a service-oriented enterprise", Accepted for publication Jun. 12, 2007; Published online Sep. 27, 2007, 17 pages.
Deloitte, "Service-Enabled Enterprise Resource Planning: Challenging the boundaries of traditional packaged applications to deliver business value", 2006, 11 pages.
Franke, Jochen, et al., "Bridging the Gap: Linking It—Infrastructure and Business Processes", 2004, 8 pages.
Office Action dated May 28, 2009 cited in U.S. Appl. No. 11/094,926.
Office Action dated Jun. 25, 2009 cited in U.S. Appl. No. 11/112,777.
Office Action dated Sep. 17, 2009 cited in U.S. Appl. No. 11/230,206.
Office Action dated Oct. 2, 2009 cited in U.S. Appl. No. 11/094,988.
Wilmot, "Foreign Keys Decrease Adaptability of Database Designs," Comm. ACM, Dec. 1984, vol. 27, No. 12, pp. 1237-1243.
Plachy, "Enterprise Solutions Structure," 1999, IBM Systems Journal, vol. 38, No. 1, pp. 4-10.
Noble, "Agile Application-Aware Adaptation for Mobility," Oct. 1997, Proc. 16th ACM Symposium, Op. Sys. Principles.
U.S. Appl. No. 12/242,430, mail date May 9, 2011, Office Action.
U.S. Appl. No. 12/187,257, mail date May 19, 2011, Office Action.
Office Action dated Nov. 18, 2009 cited in U.S. Appl. No. 10/999,852.
Office Action dated Nov. 17, 2009 cited in U.S. Appl. No. 11/076,142.
Office Action dated Jan. 13, 2010 cited in U.S. Appl. No. 11/361,199.
U.S. Appl. No. 11/361,199, mail date Oct. 12, 2010, Office Action.
U.S. Appl. No. 12/202,920, filed Sep. 2, 2008, Merrifield.
U.S. Appl. No. 12/206,589, filed Sep. 8, 2008, Merrifield.
U.S. Appl. No. 12/187,257, filed Aug. 6, 2008, Merrifield.

(56) References Cited

OTHER PUBLICATIONS

U.S. Appl. No. 12/242,430, filed Sep. 30, 2008, Merrifield.
U.S. Appl. No. 12/242,412, filed Sep. 30, 2008, Merrifield.
IBM, "Orchestrating Brilliance Managing Innovation in an On-Demand World", Based on Information and belief available, at least as early as Nov. 2, 2007, 3 Pages.
Matheson, Lona, "Identifying the Strategic Opportunities of E-Business Innovation", Aug. 2006, 3 Pages.
Business Victoria—Managing & Improving Your Business—Innovation, Based on Information and belief available, at least as early as Nov. 2, 2007, 3 Pages.
Shemi, Arvindra et al., "Service Oriented Modeling for Connected Systems", Architecture Journal, 2006, Journal 7, 26 pages.
Malhotra, Yogesh, "Integrating Knowledge Management Technologies in Organizational Business Processes: Getting Real Time Enterprises to Deliver Real Business Performance", vol. 9, No. 1, 2005, pp. 7-28, Emerald Group Publishing Limited, Journal of Knowledge Management.
Garnder, Jay M., "Building Business Value Faster with Manage Services", 2005 BMC Software Inc., 8 Pages.
IBM, "Impacting Business Agility with SOA: Highlights of IBM's Recent Announcements", IBM Impact 2007, 4 Pages.
Taylor, James, "Is Business Agility an Oxymoron?" Oct. 4, 2004, 2 Pages.
Computacenter Services, "Outsourcing Enhances Business Agility", 2007, 2 Pages.
Palmer, Mark, "Event Stream Processing & Business Agility", Feb. 16, 2006, 4 Pages.
InfoSys Technologies Limited, "Enterprise Performance Management Solution", 2007, 1 Page.
Navigation Views, "Key Performance Indicators View", Based on Information and Belief Available, at least as early as Nov. 20, 2007, 1 page.
Medicke, John, et al., "Manage Business Performance, Part 2: Retail Scenarios and Business Performance Management Architecture", Jun. 1, 2004, 9 Pages.
Homann, Ulrich, "A Business-Oriented Foundation for Service Orientation", Feb. 2006, 9 Pages.
Merrifield, Ric and Tobey, Jon; "Motion Lite: A rapid Application of the Business Architecture Techniques Used by Microsoft Motion", May 2006, 20 Pages.
Starta Development Inc. "The Tools You Need: Business Innovations" Printed from http://www.startadevelopment.com/r.sh?content=BusinessInnovations on Nov. 7, 2007; 5 Pages.
Nagumo, Toshida; "Innovative Business Models in the Era of Ubiquitous Networks" NPL Papers No. 49, Jun. 1, 2002, Copyright 2002 by Nomura Research Institute, Ltd.
Li, Hua Huang and Yu, Yang Cai; "Organization and Management Innovation", (Dept. of Information Management and Information Systems, Research Center of E-Business, School of Management, Fudan University, Shanghai 200433) Printed Nov. 7, 2007.
Kotelnikov, Vadim; "Business Innovation: Reinventing Your Business and Competitive Rules" Printed from http://www.1000ventures.com/business_guide/innovation_business.html, Printed Nov. 7, 2007.
Office Action dated Nov. 10, 2008 cited in U.S. Appl. No. 11/094,926.
Office Action dated Feb. 3, 2009 cited in U.S. Appl. No. 11/230,206.
Office Action dated Mar. 5, 2009 cited in U.S. Appl. No. 11/076,142.
Office Action dated Mar. 5, 2009 cited in U.S. Appl. No. 10/999,852.
Office Action dated May 9, 2013 cited in U.S. Appl. No. 12/242,412.
Office Action dated Apr. 9, 2012 cited in U.S. Appl. No. 12/242,412.
Office Action dated Apr. 11, 2012 cited in U.S. Appl. No. 12/202,920.
Office Action dated Jun. 21, 2012 cited in U.S. Appl. No. 11/361,199.
Swafford, A framework for assessing value chain agility, Dec. 2006, International Journal of Operations & Production Management, vol. 26, p. 118-140.
Notice of Allowance dated May 23, 2012 cited in U.S. Appl. No. 12/187,257.
Office Action dated Sep. 1, 2011 cited in U.S. Appl. No. 12/202,920.
Office Action dated Sep. 6, 2011 cited in U.S. Appl. No. 12/242,412.
Notice of Allowance dated in Sep. 7, 2011 cited in U.S. Appl. No. 12/242,430.
Office Action dated Sep. 9, 2011 cited in U.S. Appl. No. 12/187,257.
Office Action dated Oct. 12, 2011 cited in U.S. Appl. No. 11/361,199.
Office Action dated Oct. 7, 2011 cited in U.S. Appl. No. 12/206,589.
Office Action dated Oct. 2, 2012 cited in U.S. Appl. No. 12/242,412.
Notice of Allowance mailed Feb. 6, 2012 cited in U.S. Appl. No. 12/206,589.
Notice of Allowance dated in Dec. 1, 2011 cited in U.S. Appl. No. 12/242,430.

\* cited by examiner

LINKING ENTERPRISE RESOURCE PLANNING DATA TO BUSINESS CAPABILITIES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Many businesses use enterprise resource planning ("ERP") to coordinate all resources, information, and activities needed to complete business processes such as order fulfillment and billing. An ERP system typically supports most of the business system and maintains tables and other entities in a common database. For example, all the data for manufacturing, supply chain management, financials, projects, human resources, etc., can be maintained in a common database. Through the common database different business units can store and retrieve information in real-time. ERP systems are advantageous for a number of reasons, including standardization, lower maintenance, providing a common interface for accessing data, and greater and more efficient reporting capabilities.

For example, businesses are typically required to report data for inclusion in Standard Industrial Classification ("SIC") or North American Industry Classification System ("NAICS"). Many businesses also report data to regulatory bodies, such as, for example, the Environmental Protection Agency ("EPA"), Securities and Exchange Commison ("SEC"), and Public Company Accounting Oversight Board ("PCAOB"). For example, publicly held corporations can report financial data including off-balance sheet transactions, pro-forma figures, stock transactions for corporate officers, and auditing information to the SEC for compliance with federal law.

As such, ERP data is typically formulated for generic use in reporting and compliance. For example, ERP data can be formatted for generating statistics for broad economic analysis (e.g., NAICS reporting), for statutory compliance (e.g., Sarbanes-Oxley), etc., in accordance with generic externally defined formats. Thus, ERP data typically lacks any industry-specific structure.

This is problematic since the ability of an organization to understand the underlying basis for generated ERP data in these and other reports is important to staying competitive in a given field. For example, such understanding can be useful when evaluating potential vertical industry strategies, such as, for example, introducing a new product, changing customer service procedures, that might impact performance.

Further, in many organizations, there is no defined link between ERP data and business components that drive potential vertical industry strategies. Thus, the usefulness of ERP data in making decisions with respect to vertical-industry strategies is limited. For example, it is difficult for an organization to tell from ERP data what business components correspond more or less strongly to the ERP data.

BRIEF SUMMARY

The present invention extends to methods, systems, and computer program products for linking enterprise resource planning data to business capabilities. A computer architecture accesses a schema-based model for the organization. The schema-based model models a plurality of interrelated business capabilities for the organization at a specified level of detail. Each business capability represents a portion of what work the organization does.

The computer architecture accesses a schema-based representation of a portion of enterprise resource planning data for the organization. The portion of enterprise resource planning data is formatted for purposes of report generation. The computer architecture identifies an express schema-based link between the portion of enterprise resource planning data and each of the plurality of interrelated business capabilities. Each schema based-link links the portion of enterprise resource data to a corresponding business capability Each schema-based link includes property values indicative of a corresponding business capability's contribution to the portion of enterprise resource planning data. The computer architecture utilizes the property values to identify what business capabilities specifically contribute to the portion of enterprise resource data. A business related decision is made with respect to the specified portion of enterprise resource planning data based on the identified business capabilities and the property values.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
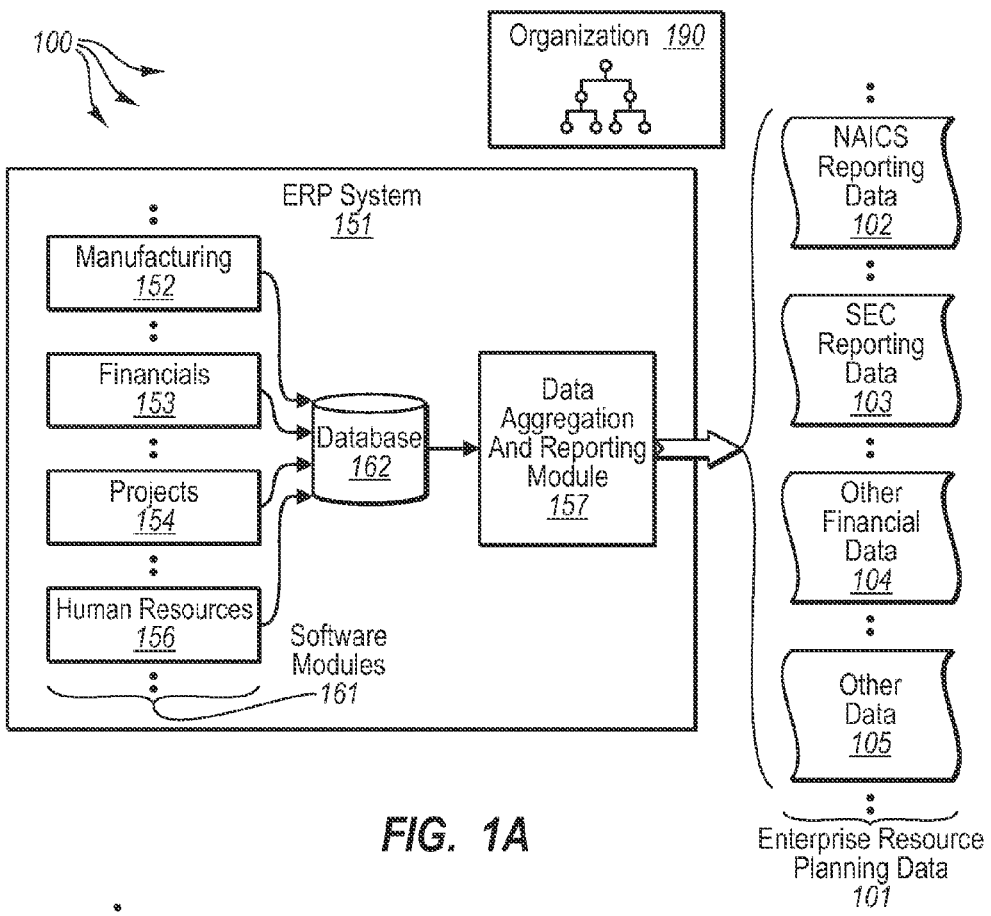
FIG. 1A illustrates an example computer architecture for generating enterprise resource planning data.

The present invention extends to methods, systems, and computer program products for linking enterprise resource planning data to business capabilities. A computer architecture accesses a schema-based model for the organization. The schema-based model models a plurality of interrelated business capabilities for the organization at a specified level of detail. Each business capability represents a portion of what work the organization does.

The computer architecture accesses a schema-based representation of a portion of enterprise resource planning data for the organization. The portion of enterprise resource planning data is formatted in a format for purposes of report generation. The computer architecture identifies an express schema-based link between the portion of enterprise resource planning data and each of the plurality of interrelated business capabilities. Each schema based-link links the portion of enterprise resource data to a corresponding business capability Each schema-based link includes property values indicative of a corresponding business capability's contribution to the portion of enterprise resource planning data. The computer architecture utilizes the property values to identify what business capabilities specifically contribute to the portion of enterprise resource data. A business related decision is made with respect to the specified portion of enterprise resource planning data based on the identified business capabilities and the property values.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, a business capability indicates "what" work is performed, such as, for example, "Purchase Goods". Entities that contribute to the performance of a capability indicate "how" work is performed, such as, for example, an employee uses an software application to generate a request for proposal ("RFP") and sends the RFP to prospective sellers, a Web service receives bids from prospective sellers, employees and automated analysis tools interact to evaluate received bids and identify a small subset of the best bids, a management committee then conducts a review process over small subset, a final selected bid is approved by the CEO, the final selected bid is then forwarded to purchasing, purchasing uses a Web service to purchase goods from the winning organization.

Multiple different implementations of "how" work is performed can each contribute to "what" work is performed. For example, for an airline, a first combination of entities from various business layers can be blended together to represent online check in, a second different combination of entities from various business layers can be blended kiosk check in, and a third different combination of entities from various business layers can be blended counter check in, for airline flights. Each of online check in, kiosk check in, and counter check in can contribute to a business capability for checking in passengers.

FIG. 1A illustrates example computer architecture 100 that facilitates generating enterprise resource planning ("ERP") data for organization 190. Organization 190 can be virtually any type of business related entity, such as, for example, a corporation (profit or non-profit), a partnership, a limited partnership ("LP"), a limited liability partnership ("LLP"), a limited liability corporation ("LLC"), a sole proprietorship, etc. A business architecture can include both internal (controlled by organization 190) and external (not controlled by organization 190) business capabilities.

Referring to FIG. 1A, computer architecture 100 includes ERP system 151. Generally, ERP system 151 can integrate a variety of business related functions for organization 190. For example, ERP system 151 can permit software modules 161, including manufacturing 152, financials 153, projects 154, human resources 156, etc., to access data through the use of common database 162. Each of software modules 161 can have access to common database 162 to store and retrieve data, facilitating integrated operation between software modules 161.

Data aggregation and reporting module 157 can access data from database 162 and generating reporting and other types of data. For example, data aggregation and reporting module 157 can generate enterprises resource planning data 101. Enterprises resource planning data 101 can include a variety of different types of data, such as, for example, master data (related to customers, vendors, etc.), transaction data (related to orders, receipts, etc), and lookup values. ERP data can for formatted for a variety of different purposes.

For example, NAICS reporting data 102 can be formatted for submission to the United States census bureau and/or for submission to other private entities that track industry-wide dat. SEC reporting data 103 can be formatted for submission to Public Company Accounting Oversight Board ("PCAOB") for compliance with the Sarbanes-Oxley act. Other financial data 104 (e.g., spending data by business unit) and other data 105 can be formatted for specific use by organization 190. As such, organization 109 can use enterprises resource planning data 101 (along with other data), when making business related decisions.

Figure 1B:
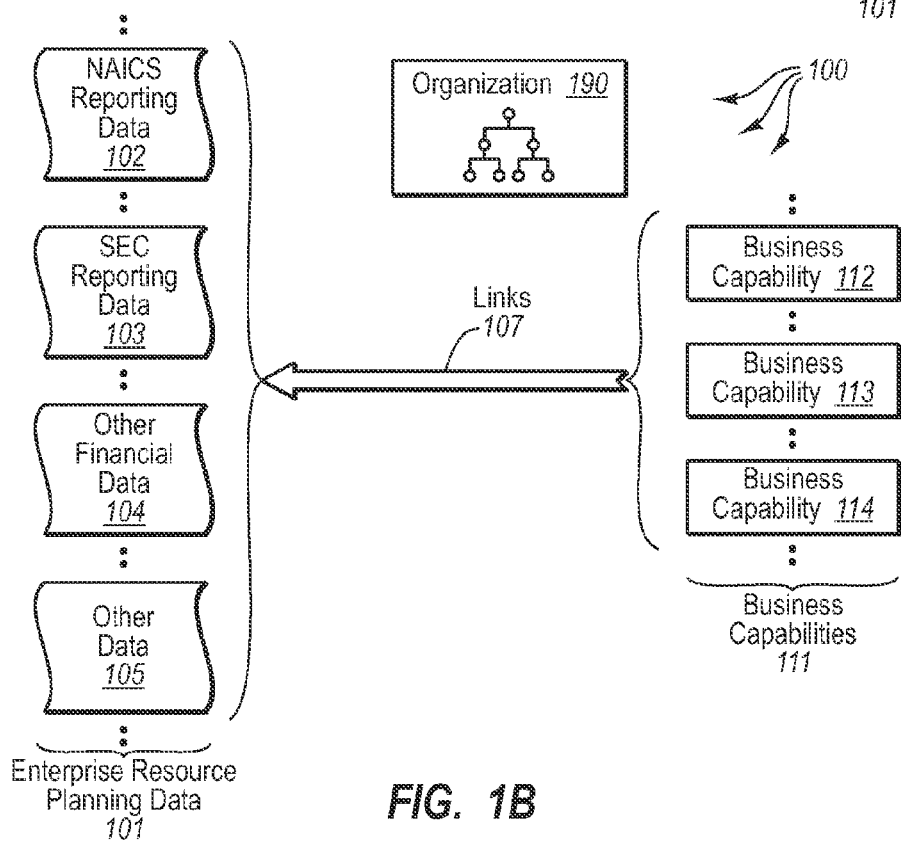
FIG. 1B illustrates an example computer architecture that facilitates linking enterprise resource planning data to business capabilities.

FIG. 1B illustrates example computer architecture 100 that facilitates linking enterprise resource planning data 101 to business capabilities 111. Business capabilities 111 include a plurality of business capabilities included business capabilities 112, 113, and 114. Each of business capabilities 112, 113, and 114 can each be part of a model that models the business architecture for organization 190. A business capability's contribution to a portion of ERP data is modeled in a schema-defined link from the business capability to organizational strategy. That is, a link can link ERP data to capabilities of an organization that transform the data during end-to-end business processes. For example, links 107 link the contributions of business capabilities 101 to enterprise resource planning data 101.

A business capability can have a link to each portion of enterprise resource data to which it contributes. Through links, each business capability can contribute to zero or more different portions of enterprise resource planning data. For example, business capability 112 can contribute to NAICS reporting data 102 and other data 105. Thus, links 107 can include links from business capability 112 to each of NAICS reporting data 102 and other data 105. Business capability 113 can contribute to NAICS reporting data 102, SEC reporting data 103, and other financial data 104. Thus, links 107 can include links from business capability 113 to each of NAICS reporting data 102, SEC reporting data 103, and other financial data 104. Business capability 114 may contribute to other types and/or formats of ERP data (not shown) in enterprise resource planning data 101. Thus, links 107 can include links from business capability 114 to each of other types and/or formats of ERP data.

Values on links 107 indicate a level of contribution from a business capability to a portion of ERP data. Virtually any mechanism for determining one contribution relative to another can be used. In some embodiments, numerical values are used. In these embodiments, higher numerical values correlate to higher contributions and lower number values correlate to lower contributions.

In some embodiments, business models and data format definitions for business capabilities are generally described as indicated in Table 1.

TABLE 1

| | |
|---|---|
| Models | Models serve to group capabilities into distinct groups that describe a single business. Models can contain all the capabilities defined for the business as well as how any defined capabilities relate to each other in terms of hierarchical decomposition and process flow relationships. Models facilitate the segmentation of data in a repository into distinct business models which can be compared with one another but are separate from each other. Further, while capability data is defined within a model, other data elements of the data model are outside of the model and facilitate the comparison of different models with one another. |
| Capabilities | Capabilities are individual business functional areas that are modeled in at least three different ways in the model. Capabilities can be modeled as individual things with their own set of properties; as a decomposition hierarchy of functional areas; and as connected in simple business process flows. Coarser (or higher level) capabilities can include a set of more granular (or lower level) capabilities, such as, for example, when a higher level capability is decomposed into its constituent parts. The assignment of |

TABLE 1-continued

| | |
|---|---|
| | properties to capabilities may occur at multiple levels in a hierarchy, which can be used to control later data transformations. For example, when a higher level capability is manipulated through a transformation, corresponding lower level capabilities' properties can be considered in the transformation |
| Capability Inputs and Outputs | Capability Inputs and Outputs are the artifacts and events that are consumed and/or produced by business capabilities. They represent what is outward and visible about the behavior of the capabilities. Inputs can be consumed and outputs can be produced independently of other inputs and outputs. For example, there is no requirement that all the inputs for a capability be consumed before the capability starts. Likewise, there is no requirement that all the processing of a capability be completed before an output can be produced. |
| Processes | Processes are networks of business capabilities that are connected in a flow to illustrate and end-to-end view of a business process. Processes define the connections between capabilities that enable larger business functions. Processes modeled in the data model can refer to cross-capability processes that represent traversal of boundaries between capabilities. Further, each implementation of a capability is also a network of processes. For example, a capability can be part of a process. The part of the process can include further, limited scope, capabilities. Accordingly, process and capability can be view as decomposing at essentially the same rate. |
| Connections | Connections are used to represent relationships between business capabilities. Connections can be data connections over which data, such as, for example, a business document, can flow between those capabilities. However, other types of connections are also possible. Connections may also refer to oversight or management of a business function, as frequently occurs in regulated areas of business activity. Connections can be typed such that connection types are the same across all models. Typed connections can be used to facilitate model comparisons. |
| Service Levels | Service levels refer to the general expectation of the performance of a capability. Service levels attach performance and accountability attributes to a capability in varying degrees of formality (e.g., contractual) and time (e.g., historical, current, target, and maximum). In some embodiments, a capability includes a verb and noun phrase (or such a verb-noun phrase can be construed from the capability description). Service level descriptive data associated with the capability indicates how well the capability performs the action implied by the phrase. For example, Approve Loan Application might have a service level expectation of 2 days. |

Figure 2:
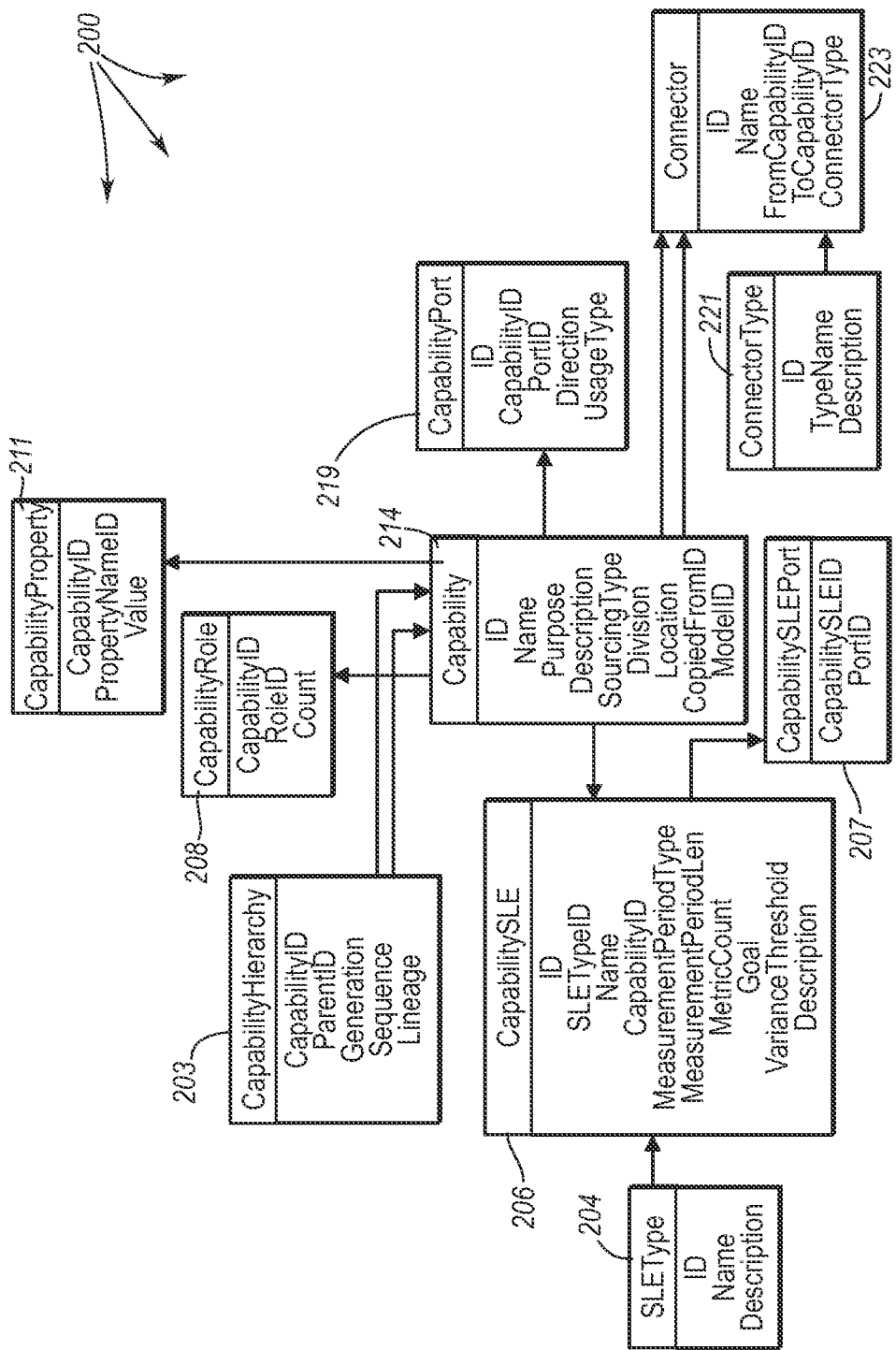
FIG. 2 illustrates a portion of an example capability modeling schema that can be used for efficiently and flexibly business modeling based upon structured business capabilities.

FIG. 2 illustrates a portion of an example capability modeling schema 200 that can be used for efficiently and flexibly business modeling based upon structured business capabilities. Capability modeling schema 200 can include data formats for modeling business capability properties, business capability inputs and outputs, business capability processes, business capability connections, and business capability service level expectations. It should be understood that business capability modeling schema 200 can be one of a plurality of schemas that includes data definitions for modeling a corresponding portions of an organization.

Depicted in FIG. 2, schema 200 includes capability data format 214. Generally, capability data format 214 can be described as indicated in Table 2.

TABLE 2

| Name | Data Type | Description |
|---|---|---|
| ID | int | Key to the capability and is used to relate other data entities to this capability. |
| Name | varchar(256) | Name that is unique within a particular model. |
| Purpose | varchar(1000) | Short description of the capability. |
| Description | varchar(8000) | A more detailed description of the capability and may explain relationships and properties of this capability as well as the capability itself. |
| SourcingType | int | This field can have three values: Internal, Outsourced, or Both. It indicates whether or not the capability is performed by an organization that is internal (part of) the organization that "owns" the model; or an organization that is a supplier of the capability to the "owner" of the model; or it is performed by both internal and external suppliers. |
| Division | varchar(100) | Identifies the business organizational area where a capability is performed. |
| Location | varchar(100) | Geographical location where the capability is performed. |
| CopiedFromID | int | Indicates the specific capability (and hence template model) from which this capability was copied. Can be a system-set value. |
| ModelID | int | Indicates the model to which this capability belongs. |

Depicted in FIG. 2, schema 200 includes capability hierarchy data format 203. Generally, capability hierarchy data format 203 can be described as indicated in Table 3.

TABLE 3

| Name | Data Type | Description |
|---|---|---|
| CapabilityID | int | Links to a capability. |
| ParentID | int | Links to a capability in the same model and indicates the parent of this capability in a hierarchical view of the model's capabilities. |
| Generation | int | Part of the lineage key which is used in certain queries. |
| Sequence | int | Part of the lineage key which is used in certain queries. |
| Lineage | varchar(20) | Indicates the entire ancestral lineage of a capability and used to perform hierarchical sorts. |

Depicted in FIG. 2, schema 200 includes capability property data format 211. Generally, capability property data format 211 can be described as indicated in Table 4.

TABLE 4

| Name | Data Type | Description |
|---|---|---|
| CapabilityID | int | Links to a capability. |
| PropertyNameID | int | Links to a user-defined property. |
| Value | varchar(250) | Value of the property for this capability. |

Depicted in FIG. 2, schema 200 includes capability port data format 219. Generally, capability port data format 219 can be described as indicated in Table 5.

TABLE 5

| Name | Data Type | Description |
| --- | --- | --- |
| ID | int | Key to the capability port and is used to relate this port to other entities. |
| CapabilityID | int | Links to the capability that is referenced by this relationship. |
| PortID | int | Links to the port that is referenced by this relationship. |
| Direction | int | Has three values and indicates whether or not the item is input into the referenced capability, output from the referenced capability, or it flows both directions. |
| UsageType | int | Links to the UsageType entity and indicates how the capability uses this item. Examples are "Read only", "Read and update", "Create", etc. |

Depicted in FIG. 2, schema 200 includes capability role data format 308. Generally, capability role data format 208 can be described as indicated in Table 6.

TABLE 6

| Name | Data Type | Description |
| --- | --- | --- |
| CapabilityID | int | References a specific capability and serves to link that capability with a specific role. |
| RoleID | int | References a specific role and links it to the referenced capability. |
| Count | int | Indicates the number of people in this role that are required to perform this capability. A value of '0' indicates that the role participation has not been quantified. |

Depicted in FIG. 2, schema 200 includes SLE type data format 204. Generally, SLE type data format 204 can be described as indicated in Table 7.

TABLE 7

| Name | Data Type | Description |
| --- | --- | --- |
| ID | int | Key to the SLEType entity and is used to relate this role to CapabilitySLE entities. |
| Name | varchar(100) | Uniquely names the type of service level that is described in this entity. This entity is assumed to be read-only by modelers because the modeling tools rely on the value of these entries to visualize service levels. Some values for service level types include "Duration", "Throughput", "Monetary Cost", "Time Cost" and "Concurrency". |
| Description | varchar(4000) | A detailed description of the service level type and how to describe specific service levels related to capabilities. |

Depicted in FIG. 2, schema 200 includes Capability SLE data format 206. Generally, Capability SLE data format 206 can be described as indicated in Table 8.

TABLE 8

| Name | Data Type | Description |
| --- | --- | --- |
| ID | int | Key to the Role entity and is used to relate this role to Capability entities. |
| SLETypeID | int | References the SLEType entity and identifies a specific way to measure a service level. |
| Name | varchar(50) | A unique name for the service level definition. |

TABLE 8-continued

| Name | Data Type | Description |
| --- | --- | --- |
| CapabilityID | int | References the capability to which this service level applies. |
| MeasurementPeriodType | varchar(50) | Names the unit of measure for the service level. For "Duration" type service levels, this should be a time period. For a "Monetary Cost" SLE type, "Dollars" or "Thousands of dollars" would be appropriate. |
| MeasurementPeriodLen | int | If the SLE type references a "Throughput" type of SLE, this field indicates the length of the measurement period for throughput. |
| MetricCount | int | An actual (current status/performance or historical performance) measurement of the SLE, such as the number of days of duration, the number of items completed for throughput, the amount of dollars for monetary cost, etc. |
| Goal | int | A target for future performance such as the number of days of duration, the number of items completed for throughput, the amount of dollars for monetary cost, etc. |
| VarianceThreshold | int | How much variation in performance (e.g., from a goal) is tolerated before a variation is noted or notification is sent. For example, when a variance threshold is exceeded an electronic mail message can be sent to appropriate management personnel |
| Description | varchar(2000) | A detailed description of the SLE for this capability. |

Depicted in FIG. 2, schema 200 includes Capability SLE Port data format 207. Generally, Capability SLE port data format 207 can be described as indicated in Table 9.

TABLE 9

| CapabilitySLEID | int | References a particular service level for a specific capability as described in a CapabilitySLE entity. It serves to link a particular service level to a particular input or output item. |
| --- | --- | --- |
| PortID | int | References a particular input or output item of a capability and links a service level to the specific item that is being measured. For example, this might reference mortgage approvals for a duration service level for a mortgage processing capability and the entire service level definition might thereby describe that 100 mortgage approvals are completed every day for the mortgage processing capability. |

Depicted in FIG. 2, schema 200 includes connector type data format 221. Generally, connecter type data format 221 can be described as indicated in Table 10.

TABLE 10

| Name | Data Type | Description |
| --- | --- | --- |
| ID | int | Key to the ConnectorType entity and is used to describe the connection type in the Connector entity. |
| TypeName | varchar(50) | A unique name that describes the type of connection. Examples are "Collaborative", "Controlling", "Dependent", etc. |
| Description | varchar(4000) | A detailed description of the connection type and helps modelers understand what connections mean in their models. |

Depicted in FIG. 2, schema 200 includes connector data format 223. Generally, connecter data format 223 can be described as indicated in Table 11.

TABLE 11

| Name | Data Type | Description |
| --- | --- | --- |
| ID | int | Key to the Connector entity and indicates the connection between two capabilities. This key is used to link this connection to other entities. |
| Name | varchar(256) | A comment that is associated with this connection between two capabilities. |
| FromCapabilityID | int | References the capability that is the source capability. Depending on the ConnectorType, the meaning of being the source capability may differ slightly. |
| ToCapabilityID | int | References the capability that is the target capability. Depending on the ConnectorType, the meaning of being the target capability may differ slightly. |
| ConnectorType | int | Link to the ConnectorType entity and indicates what the relationship between the two referenced capabilities really means. Examples are "Collaborative", "Controlling", "Dependent", etc. |

It should be understood that schema 200 is merely one example of a business capability modeling schema. It would be apparent to one skilled in the art, after having reviewed this description, that embodiments of the present invention can be used with a wide variety of other business capability modeling schemas, in addition to schema 200. Further, modeling business capabilities does not require that capability attributes for all the data formats in schema 200 be accessible. For example, a capability and connecter can be used to model a business capability based on capability data format 214 and connector data format 223, without accessing capability attributes corresponding to other data formats. Thus, schema 200 defines data formats for business capability attributes that are accessed, but does not require that all data formats be populated to generate a business capability model.

Accordingly, in some embodiments, the business capabilities for an organization are included together in a collection of business capabilities (e.g., a business architecture). A collection of business capabilities can be represented as a (e.g., structured or schematized) business capability model. An organization can formulate business capability attributes representing current performance of their collection of business capabilities. A modeling application (not shown) can receive the business capability attributes (e.g., from a business capability business layer) and model the business capability attributes into a business capability model. A business capability model can be represented in a variety of different ways depicting various levels of detail (e.g., up to the level of detail of the business capability attributes). A business capability model can be configured visually for output at a user-interface and/or can be retained as data for further processing.

Figure 3A:
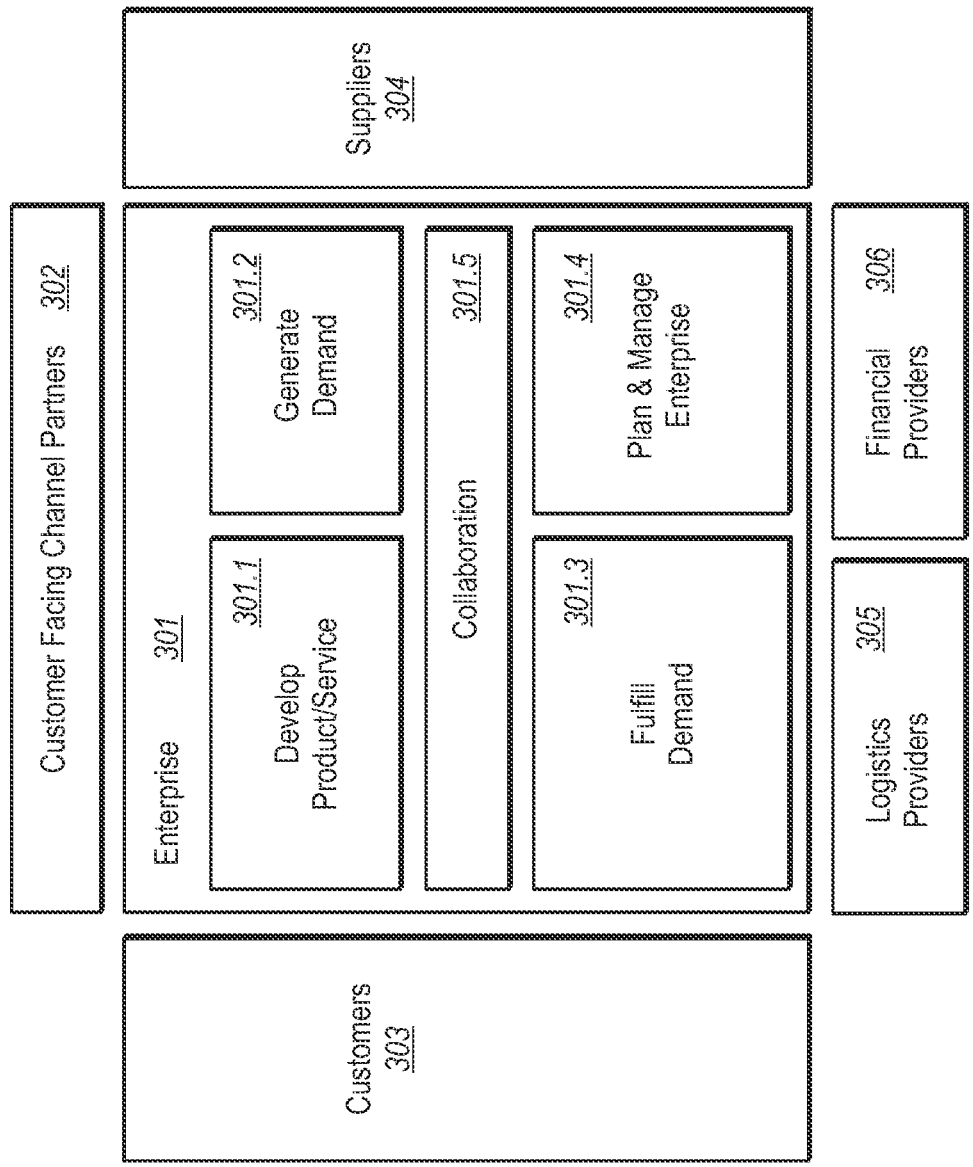
FIGS. 3A and 3B illustrate a visual representation of a collection of business capabilities at varied levels of detail.

Levels of detail can be used to represent (potentially interconnected) sub-capabilities that contribute to the performance other capabilities. FIGS. 3A through 3E depicted collections of business capabilities having various levels of detail and interconnection. Referring now to FIG. 3A, FIG. 3A depicts an example visual representation 300 (e.g., a model) of a collection of business capabilities for an organization. As depicted, the visually rendered business capabilities in visual representation 300 are rendered with varied levels of detail. For example, customer facing channel partners 302, customers 303, suppliers 304, logistic providers 305, and financial providers 306 are rendered with less detail. On the other hand, enterprise 301 is rendered with more detail, depicting other business capabilities that contribute to the performance of enterprise 301. For example, develop product service 301.1, generate demand 301.2, fulfill demand 301.3, plan and manage enterprise 301.4, and collaboration 301.5 are expressly rendered within enterprise 301. Thus, visual representation 3000 represents that develop product service 301.1, generate demand 301.2, fulfill demand 301.3, plan and manage enterprise 301.4, and collaboration 301.5 contribute to the performance of enterprise 301.

Figure 3B:
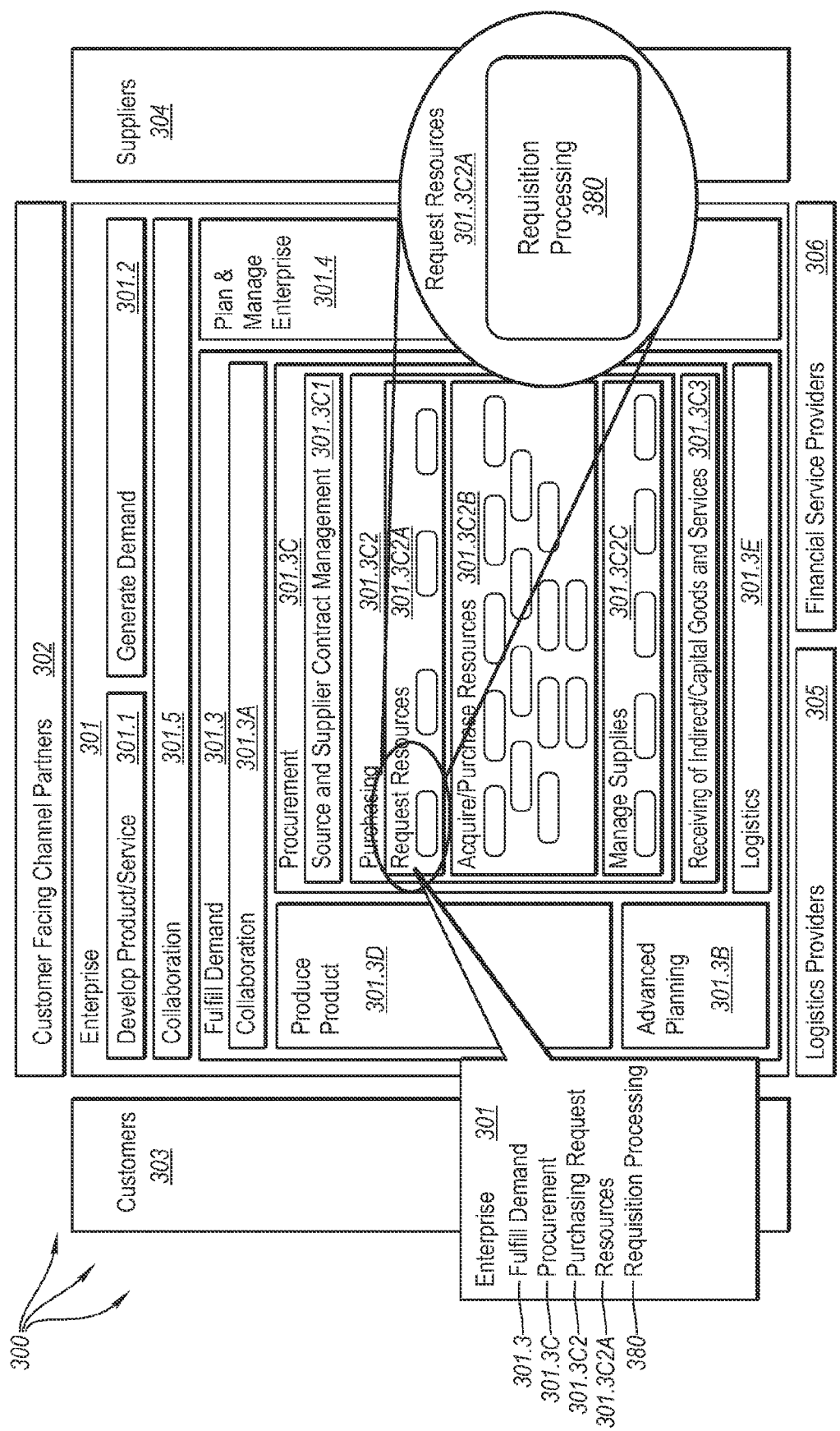

Turning now to FIG. 3B, FIG. 3B depicts visual representation 300 with further levels of detail. FIG. 3B is representative of the way business capabilities can be broken down/decomposed into other capabilities. For example, fulfill demand 301.3 is increased by a number of levels of detail. Fulfill demand 301.3 includes collaboration 301.3A, advanced planning 301.3B, procurement 301.3C, produce product 301.3D, and logistics 301.3E. Thus, collaboration 301.3A, advanced planning 301.3B, procurement 601.3C, produce product 301.3D, and logistics 301.3E contribute to the performance of fulfill demand 301.3 (and as a result also contribute to the performance of enterprise 301).

Procurement 301.3C is further detailed to include source and supplier contract management 301.3C1, purchasing 301.3C2, and receiving of indirect/capital goods and services 301.3C3. Thus, contract management 301.3C1, purchasing 301.3C2, and receiving of indirect/capital goods and services 301.3C3 contribute to the performance of procurement 301.3C (and as a result also contribute to the performance of fulfill demand 301.3 and performance of enterprise 301).

Purchasing 301.3C2 is further detailed to include request resources 301.3C2A, acquire/purchase resources 301.3C2B, and manage supplies 301.3C2C. Thus, request resources 301.3C2A, acquire/purchase resources 301.3C2B, and manage supplies 301.3C2C contribute to the performance of purchasing 301.3C2 (and as a result also contribute to the performance of procurement 301.3C, fulfill demand 301.3, and performance of enterprise 301). Requisition processing 380 is a further sub-capability of request resources request resources 301.3C2A.

Figure 3C:
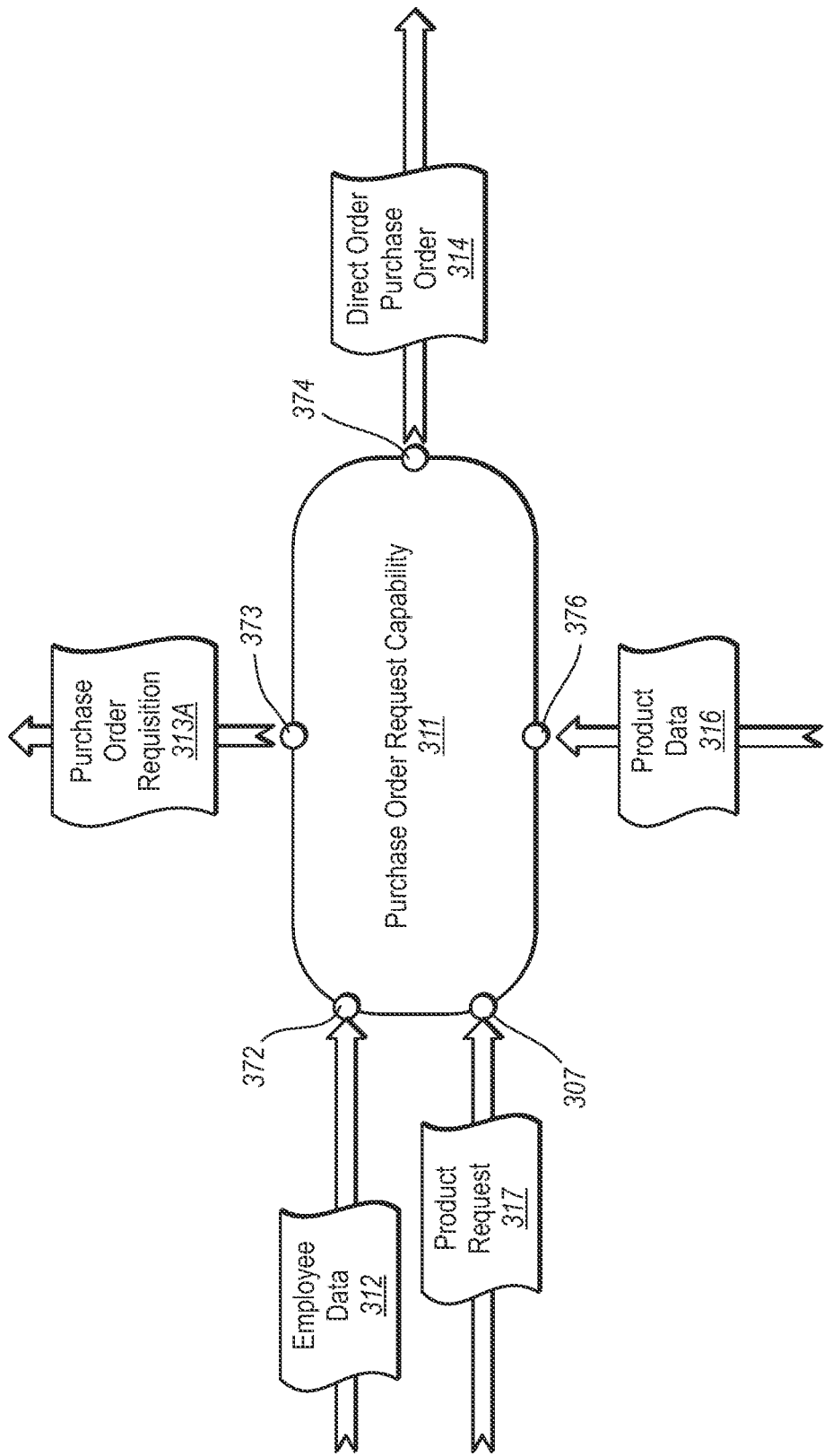
FIG. 3C illustrates an example of a modeled business capability.

Business capability models can also represent data that flows into and data that flows out of the modeled business capabilities. For example, FIG. 3C illustrates an example of a modeled business capability. FIG. 3C, includes purchase order request capability 311 (e.g., modeled based on structured capability data format). Purchase order request capability 311 includes ports 372, 376, and 307 (e.g., modeled based on a structured port data format) that receive employee data 312, product data 316, and product request 317 respectively (e.g., from other business capabilities). Purchase order request capability 311 can use employee data 312, product data 316 and product request 317 to formulate a purchase order request.

Purchase order request capability 311 includes ports 373 and 374 (e.g., modeled based on the structured port data format) that can send purchase order requisition 313A and direct order purchase order 314 respectively (e.g., to other business capabilities). Purchase order request capability 501 can include logic that determines, based on one or more of receive employee data 312, product data 316 and produce request 317, whether purchase order requisition 513A and/or direct order purchase order 314 is to be sent.

Thus, embodiments of the present invention can also utilize models of a network of business capabilities. A first business capability is modeled based upon formatted business capability attributes. A second business capability is modeled based upon the formatted business capability attributes. A connection between the first business capability and the second capability is modeled based upon the formatted business capability attributes.

Figure 3D:
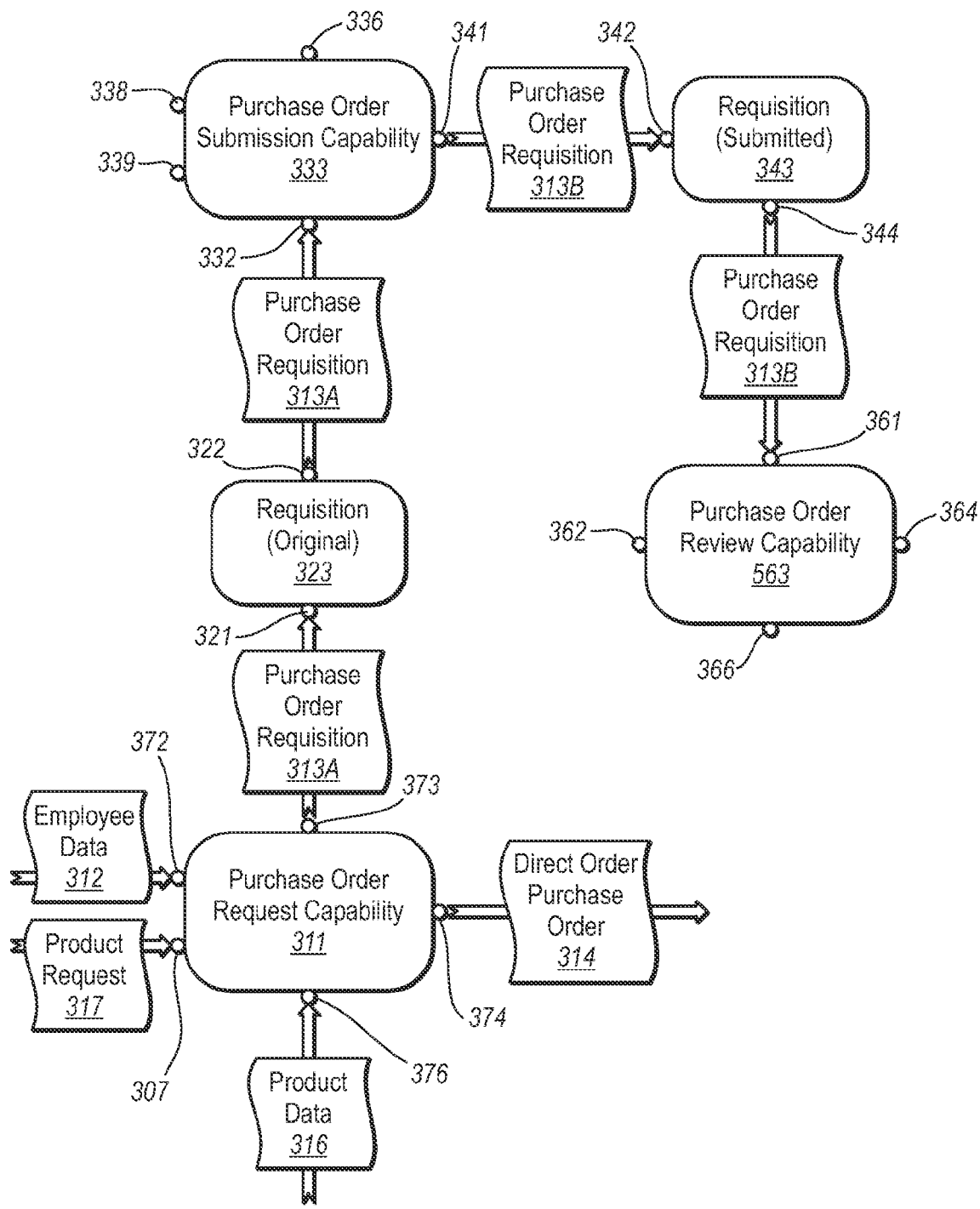
FIG. 3D illustrates a first view of an example of a network of modeled business capabilities.

FIG. 3D illustrates a first view of an example of a network of modeled business capabilities including purchase order request capability 311. As depicted, purchase order request capability 311 (a capability) sends purchase order request 313A out of port 373 to requisition 323 (a connector).

Requisition 323 receives purchase order requisition 313A at port 312. Requisition 323 sends purchase order requisition 313A out of port 322 to purchase order submission capability 333. Thus, requisition 323 transfers purchase order requisition 313A from purchase order request capability 311 to purchase order submission capability 333. Accordingly, a connector can be viewed as a business capability wherein the capability of the connector is to transfer data between other capabilities.

Purchase order submission capability 333 receives purchase order requisition 313A at port 332. Purchase order submission capability 333 includes other ports, including ports 336, 338, 339, and 341. Each of the ports 336, 338, 339, and 341 can be used to send data to and/or receive data from other capabilities or connectors. More specifically, purchase order submission capability 332 sends purchase order 313B out of port 341 to requisition 343 (a connector). Although similar to purchase order requisition 313A, purchase order requisition 313B can differ from purchase order 313A as a result of processing at purchase order submission capability 332.

Requisition 343 receives purchase order requisition 313B at port 342. Requisition 343 sends purchase order requisition 313B out of port 344 to purchase order review capability 363. Purchase order review capability 563 receives purchase order requisition 313B at port 361. Purchase order review capability 363 includes other ports, including ports 362, 364, and 366. Each of the ports 362, 364, and 366 can be used to send data to and/or receive data from other capabilities or connectors.

Although one-way ports and connectors have been depicted in FIG. 3D, it should be understood that embodiments of the present invention can include two-way ports and/or two-way connectors. For example, it may be that, from time to time, requisition 323 also transfers data from purchase order submission capability 333 (coming out of port 332 and into port 322) to purchase order request capability 311 (coming out of port 321 and into port 373). Similarly, it may be that, from time to time, requisition 343 also transfers data from purchase order review capability 363 (coming out of port 361 and into port 344) to purchase order submission capability 333 (coming out of port 342 and into port 341).

Figure 3E:
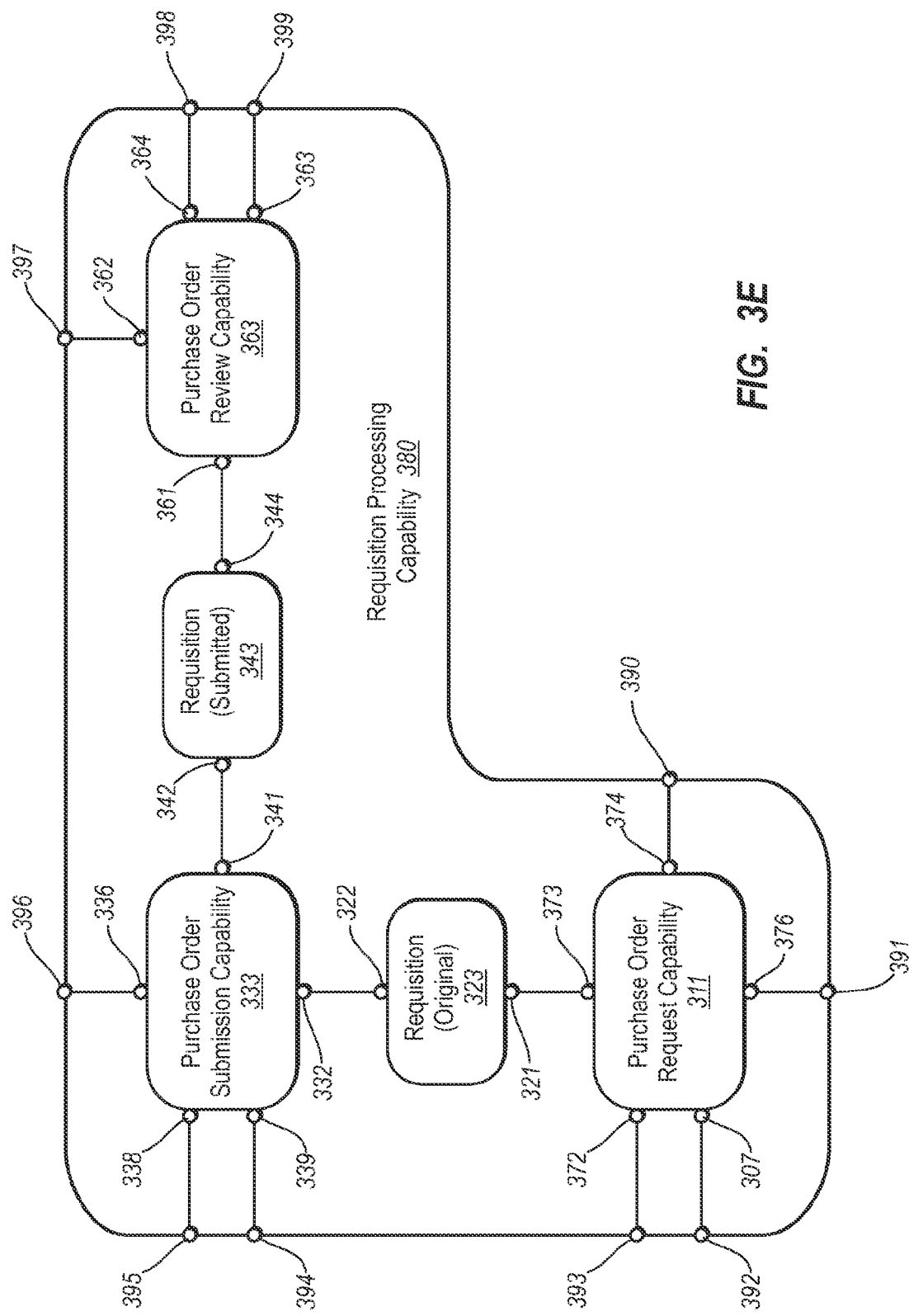
FIG. 3E illustrates a second view of the example of a network of modeled business capabilities.

A network of business capabilities can also be represented in a manner that abstracts the data exchanged between various business capabilities and connectors in the business capability network. Further, in some embodiments and as previously described, a network of more granular business capabilities (or those at higher levels of detail) can be used to model a more coarse business capability (or those at lower levels of detail). FIG. 3E illustrates a second view of the example of a network of modeled business capabilities in FIG. 3D representing requisition processing capability 380 (from FIG. 3B).

The network of business capabilities in FIG. 3E abstracts out the data that is exchanged between the business capabilities and connections in FIG. 3D. FIG. 3E further depicts that the more granular business capabilities and connections in FIG. 3D can be used to model a more coarse requisition processing capability 380. Ports 390-399 represent that requisition processing capability 380 can exchange data with other business capabilities and connectors, for example, included in request resources 301.3C2A (of FIG. 3B) or in part of some other general procurement network of business capabilities.

Although particular models have been described with respect to FIG. 3A3E, embodiments of the invention are not so limited. Embodiments of the invention can be practiced with virtually any type of model that represents business capabilities and/or business processes.

It should be understood that schemas for ERP data and/or schemas for links between business capabilities and ERP data can include data definitions indicating how the business capabilities contribute to ERP data. Thus, a business capability schema can include data definitions for representing links between business capabilities and different portions of ERP data. For example, ERP and/or link schema definitions can define contributions from business capabilities to one or more of NAICS reporting data, SEC reporting data, Environmental Protection Agency ("EPA") reporting data, as well as defining contributions from business capabilities to other types of financial data and other data.

Figure 4:
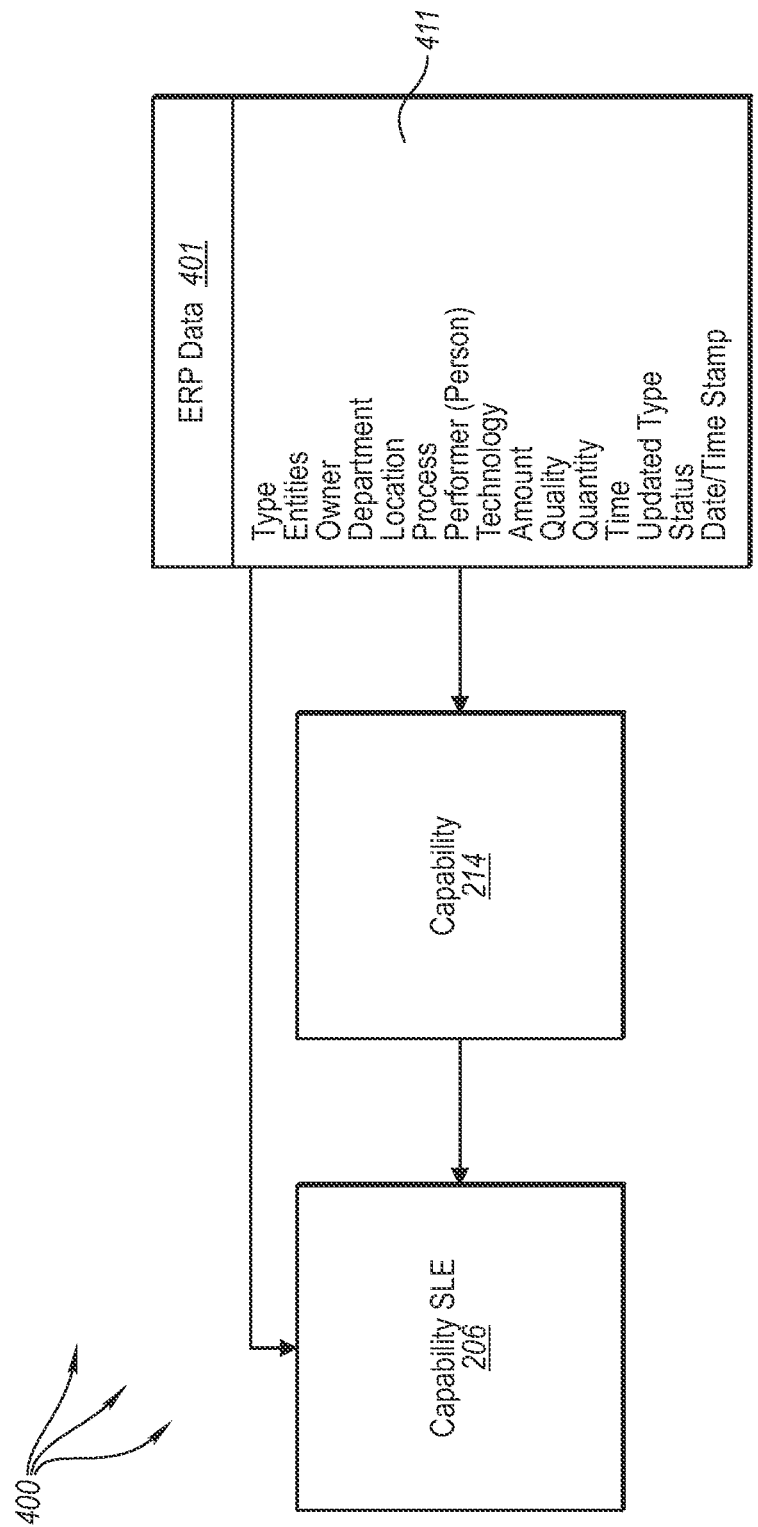
FIG. 4 illustrates a capability schema and capability SLE schema relative to an enterprise resource planning data schema.

FIG. 4 illustrates schema 400 depicting capability schema 214 and capability SLE schema 206 relative to ERP data schema 401. ERP data schema 401 can be described at a much lower/detailed level than the capability schema 214. The capability schema 214 can therefore also provide a relative classification or categorization for the SLE schema 206 and the ERP schema 401. ERP data schema 401 includes properties 411 that define a data format for ERP data. Generally, an ERP data format can be described as indicated in Table 12.

TABLE 12

| Name | Data Type | Description |
| --- | --- | --- |
| Type | VarChar | Reference, Transaction, Lookup are the three Types. Reference would be something like Customer or Company that is updated from time to time, but it is typically used to refer to for specific transactions. Transaction would be like an order or a paycheck, a specific transactional event or activity. Lookup would be a small table for things including valid values for a field like Type and those small tables are very durable in terms of their content. |
| Entities | VarChar | This refers to the data entities in the ERP system that house the information and it could be several (so an order would probably have the order header information, there may be some order |

TABLE 12-continued

| Name | Data Type | Description |
|---|---|---|
| | | details, and as status changes or if it is cancelled or returned (for example) the data may be updated to reflect the status change or new records may be created to reflect the new status to preserve a richer audit trail. |
| Owner | VarChar | The owner of the activity is the manager accountable for the work (vs. the Performer who is the person actually doing the work). |
| Department | VarChar | This is an organizational mapping to point to where in the organization the work is happening and this would include department, division, group, etc. This is a logical representation of all of that information. |
| Location | VarChar | Location refers to the physical location of the performer. |
| Process | VarChar | When the work being done is part of a specific, explicit process, the name/identifier of that process is captured here. |
| Performer (person) | VarChar | The Performer is the person doing the work reflected in this segment, |
| Technology | VarChar | Technology speaks to the specific type of technology that captures the information. In the case of ERP systems, some organizations have multiple instances based on geography or division or some other way of segmenting the organization, and this captures that information, as well as version and release information. |
| Amount | Integer | Amount is for capturing financial information and will typically be used in transactions, such as how much was paid to a specific vendor, or how much a customer paid the organization. |
| Quality | VarChar | Quality is also primarily for transactional information, but refers to the quality of the output. |
| Quantity | VarChar | Quantity is another transactional data field that captures the quantity of things consumed, produced, etc. as part of the transaction. |
| Time | Time | Time is in reference to the elapsed time |
| Update type | VarChar | This is an indicator as to whether it is a new record or whether the record is being updated (which would include a logical delete) |
| Status | VarChar | Status can have a range of values from In Progress, to Canceled, to any number of things and that value would be captured here |
| Date/Time Stamp | VarChar | Standard date/time stamp fields for add and update. |

Figure 5:
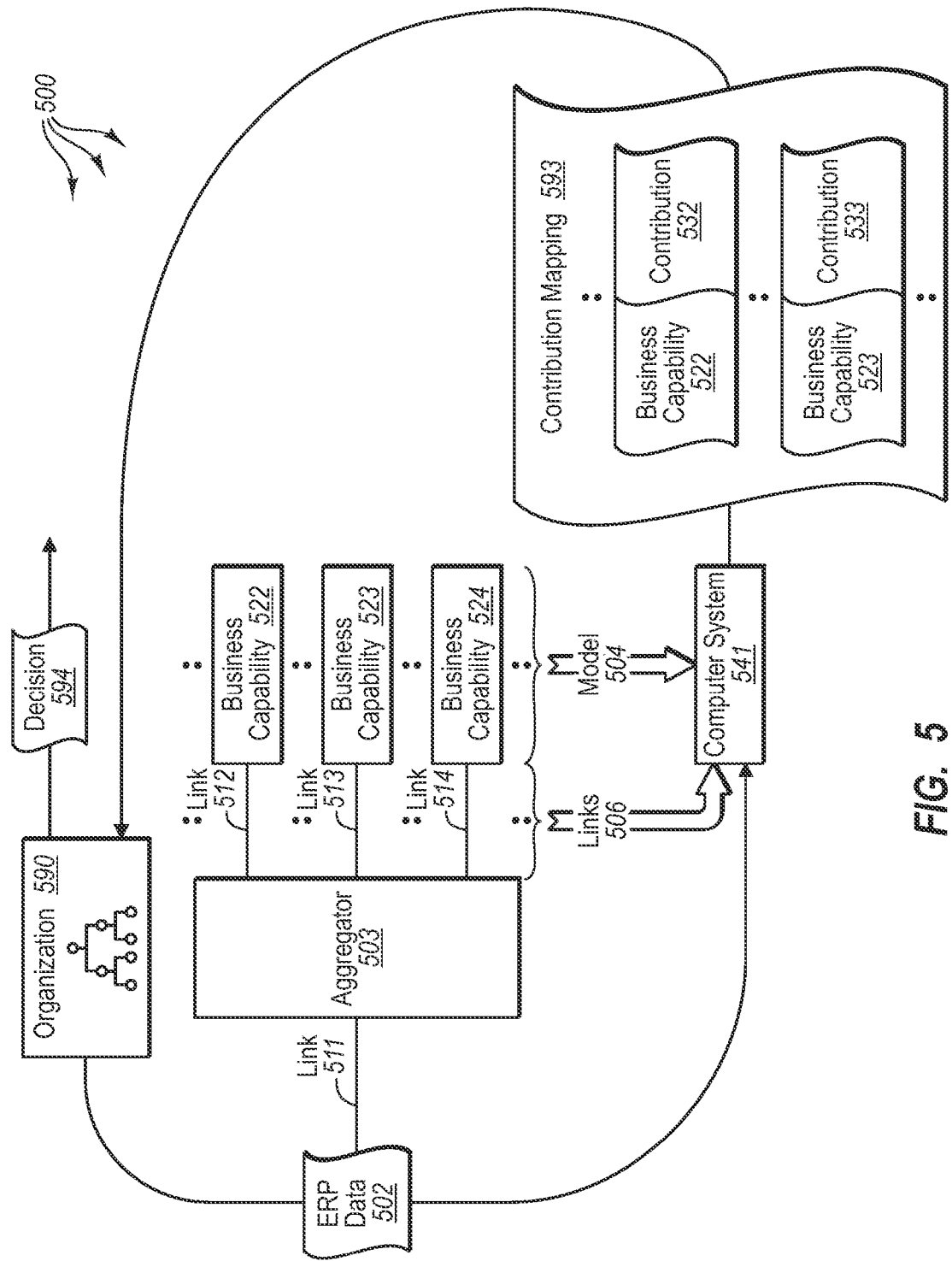
FIG. 5 illustrates an example computer architecture that facilitates determining what business capabilities contribute to enterprise resource planning data.

FIG. 5 illustrates an example computer architecture 500 that facilitates determine what business capabilities contribute to enterprise resource planning data. As depicted, computer architecture 500 includes computer system 541, model 504, and links 506. Model 504 represents a model of the business capabilities of organization 590. Links 506 represent links from model 504 to ERP data 502. Generally, computer systems 541 is configured to access model 504 and links 506 and determine, from values on links 506, the contributions of individual business capabilities (e.g., 522, 523, and 524) to ERP data 102. For example, computer system 541 can access link 512 to determine the contribution of business capability 522 to EP data 502. Computer system 541 can access ERP data from an ERP system (e.g., similar to ERP system 151) of organization 509.

Aggregator 503 is configured to receive one or more links (e.g., 512, 513, and 514) from business capabilities (522, 523, and 524 respectively) and aggregate the links into link 511 indicating the total contribution of business capabilities in model 504 to ERP data 502. Business capabilities 522, 523, and 524 can also include links to other portions or ERP data. Thus, aggregator 503 can facilitate a many-to-many relationship between ERP data and business capabilities (and vice versa).

Accordingly, aggregator 503 can include one or more components to transform, normalize, regulate, etc., received links relative to one another to properly evaluate the contribution of each received link to a corresponding portion of ERP data For example, aggregator 503 can transform, normalize, regulate, etc., links 512, 513, and 514 relative to one another to properly evaluate the contribution of each of the links 512, 513, and 514 to ERP data 502. Aggregator 503 can also be used to calculate the contribution of a subset of business capabilities to ERP data. For example, aggregator 503 can calculate the contribution of just links 512 and 513 into link 511 indicating the contribution of business capabilities 522 and 523 to ERP data 502.

Computer system 541 can generate a contribution mapping that maps contribution to a portion of ERP data on per business capability basis. Organization 590 can use the contribution mapping to make business related decisions, such as, for example, decisions with respect to vertical industry strategies. Accordingly, embodiments of the invention essentially provide a pre-defined common vocabulary to uniformly consider how business capabilities contribute to different portions of ERP data.

Figure 6:
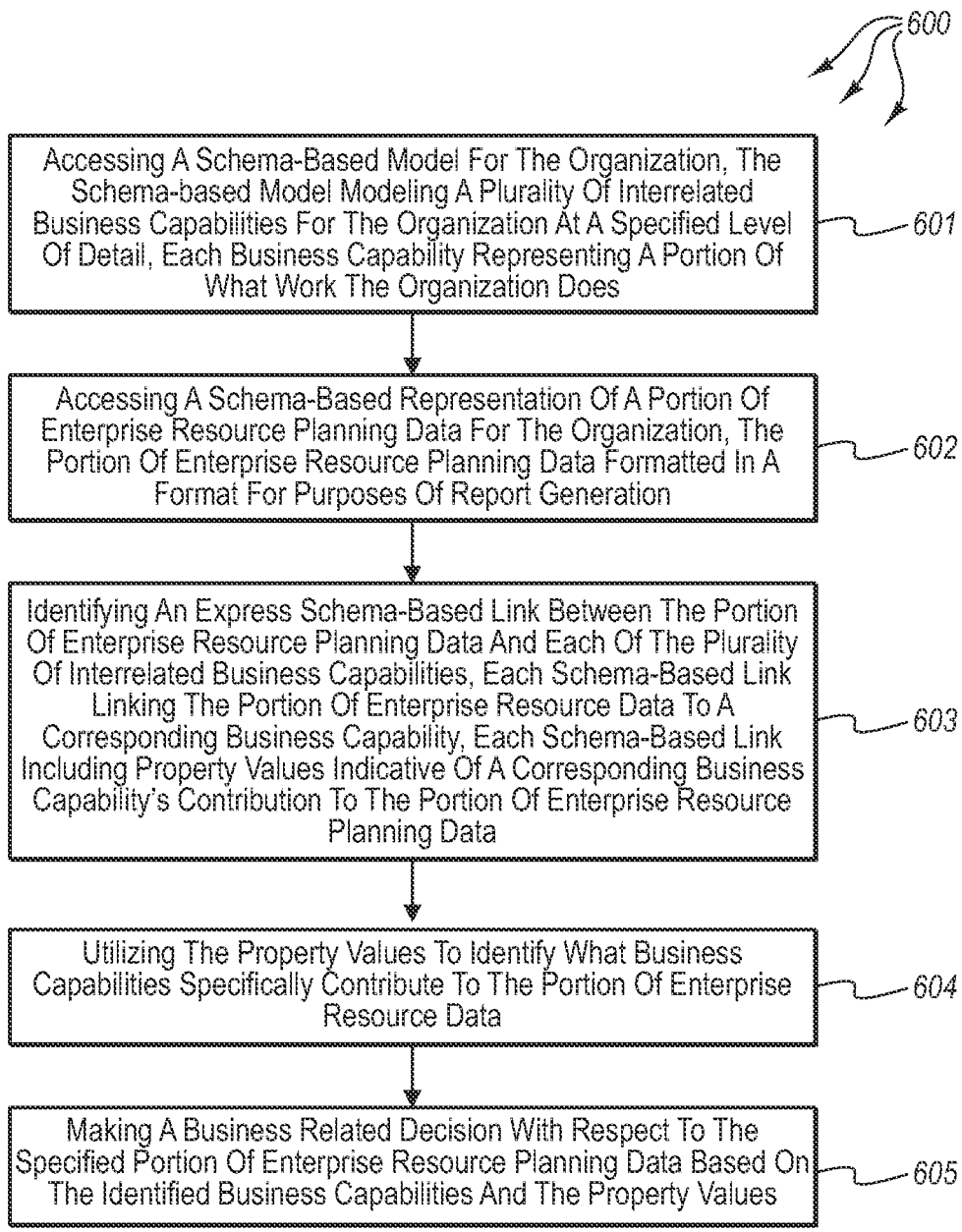
FIG. 6 illustrates an example flowchart of a method for making a business related decision based on how a specified portion of enterprise resource planning data maps to an organization's business capabilities.

FIG. 6 illustrates an example flowchart of a method 600 for making a business related decision based on how a specified portion of enterprise resource planning data maps to an organization's business capabilities. Method 600 will be described with respect to the components and data of computer architecture 500.

Method 600 includes an act of accessing a schema-based model for the organization, the schema-based model modeling a plurality of interrelated business capabilities for the organization at a specified level of detail, each business capability representing a portion of what work the organization does (act 601). For example, computer system 541 can access model 504. Business capabilities 522, 523, 524, etc., can model a portion of what an organization 590 does.

Method 600 includes an act of accessing a schema-based representation of a portion of enterprise resource planning data for the organization, the portion of enterprise resource planning data formatted in a format for purposes of report generation (act 602). For example, computer system 541 can access ERP data 502. ERP data 502 can be a portion of ERP data for organization 590. ERP data 502 can formatted in accordance with an ERP schema (e.g., 401), such as, for example, for inclusion in a report to a government agency.

Method 600 includes an act of identifying an express schema-based link between the portion of enterprise resource planning data and each of the plurality of interrelated business capabilities, each schema based-link linking the portion of enterprise resource data to a corresponding business capability, each schema-based link including property values indicative of a corresponding business capability's contribution to the portion of enterprise resource planning data (act 603). For example, computer system 541 can access links 506. From links 506, computer system 541 can identify links 512, 513, and 514 between business capabilities 522, 523, and 524 respectively and ERP data 502. Links 512, 513, and 514 can include a property value indicative of a contribution to ERP data 502. For example, link 512 can indicate a contribution of business capability 522 to ERP data 502.

Method 600 includes an act of utilizing the property values to identify what business capabilities specifically contribute to the portion of enterprise resource data (act 604). For example, from links 506, computer system 541 can identify what business capabilities in model 504 contribute to ERP data 502. Contributing business capabilities can have a positive/negative property value (e.g., number or percentage) on their corresponding link. Non-contributing business capabilities can have a zero or NULL property value on their corresponding link.

From the property values, computer system 541 can create contribution mapping 593. Contribution mapping 593 can map each business capability to its corresponding contribution to ERP data 502. For example, contribution mapping 593 maps business capability 522 to contribution 532 (e.g., a property value on link 512). Similarly, contribution mapping 593 maps business capability 523 to contribution 533 (e.g., a property value on link 513). Non-contributing business capabilities can be omitted from contribution mapping 593.

Method 600 includes an act of making a business related decision with respect to the specified portion of enterprise resource planning data based on the identified business capabilities and the property values (act 605). For example, organization 590 can utilize contribution mapping 593 to make decision 594. Decision 594 can be, for example, a decision to implement or not implement a vertical industry strategy a strategic direction based on how different business capabilities in model 504 contribute to ERP data 502. A strategic direction can viewed relative to a specified time frame. For example, a shorter term strategic direction can be one to two years in the future. A longer term strategic direction can be three to five years in the future.

Accordingly, embodiments of the invention provide a linkage between schematized ERP data and schematized business capabilities. The linkage provides a the ability to report against this model in a visual way that permits the linkage of such things as busines value, performance, maturity, interconnectedness, process standardization, compliance, etc. As such, businesses capabilities can be linked to specific spend amounts in ERP data.

In some embodiments, ERP financial data is aligned and enforced against business architecture. For example, a specific project to fund "Develop and Manager Provider Network", could touch many business capabilities and spending can happened at different times. Through linkages between ERP data and business capabilities, spending per business capability can be captured and reconciled.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, in a computer architecture, for using a plurality of weighted links between enterprise resource planning data of an organization and business capabilities of the organization to facilitate making business-related decisions based on how a specified business capability contributes to a specified portion of enterprise resource planning data, the method comprising:

an act of a computing system, including a processor and memory, accessing a schema-based model that models a business architecture for the organization, the schema-based model modeling a plurality of interrelated business capabilities for the organization at a specified level of detail, each business capability representing a different type of work the organization performs;

an act of the computing system accessing a schema-based representation of enterprise resource planning data for the organization, the enterprise resource planning data formatted in a generic format for purposes of report generation related to industrial classification and/or regulatory compliance, the enterprise resource planning data lacking organization-specific formatting, the enterprise resource planning data including a plurality of different portions, each different portion relating to a different type of business-related function of the organization;

an act of the computing system identifying a plurality of express schema-based links between the enterprise resource planning data and the plurality of interrelated business capabilities, each schema based-link linking a particular business capability to a corresponding portion of the enterprise resource planning data that is transformed during a business process involving the particular business capability, each schema based-link is weighted by including in each express schema-based link a corresponding property value that is indicative of a relative contribution of the particular business capability to the corresponding portion of the enterprise resource planning data;

based on the identified plurality of express schema-based links and the corresponding property values weighting each link, an act of the computing system generating a contribution mapping, the contribution mapping reflecting the relative contribution that each of the plurality of interrelated business capabilities makes to each of the plurality of different portions of the enterprise resource planning data; and an act of making a business related decision with respect to a particular portion of enterprise resource planning data based on the contribution mapping, wherein the decision is made by an act of aligning the goals of an organizational project with the relative contributions of the business capabilities.

2. The method as recited in claim 1, wherein the act of accessing a schema-based model that models the business architecture for the organization comprises an act accessing a business capability model, the capability model defining service level expectations that can contribute to enterprise resource planning data.

3. The method as recited in claim 1, wherein the act of accessing a schema-based representation of enterprise resource planning data for the organization comprises an act of accessing schematized financial data for the organization.

4. The method as recited in claim 1, wherein the act of accessing a schema-based representation of enterprise resource planning data for the organization comprises an act of accessing enterprise resource planning data formatted for inclusion in a report to a governmental agency.

5. The method as recited in claim 1, wherein the act of accessing a schema-based representation of enterprise resource planning data comprise an act of accessing schematized data from a database of an enterprise resource planning system for the organization.

6. The method as recited in claim 1, wherein the act of accessing a schema-based representation of enterprise resource planning data comprises an act of accessing data for a proposed project the organization is considering undertaking.

7. The method as recited in claim 1, wherein the act of making a business related decision with respect to the particular portion of enterprise resource planning data comprises an act of making a decision with respect to one or more of: a vertical industry strategy for the organization and a strategic direction for the organization.

8. The method as recited in claim 1, wherein the plurality of express schema-based links include one or more links between a particular one of the interrelated business capabilities and a plurality of the different portions of the enterprise resource planning data.

9. The method of claim 1, wherein the plurality of different portions of the enterprise resource planning data comprise at least one of: SIC (Standard Industrial Classification) reporting data, NAICS (North American Industry Classification System) reporting data, SEC (Securities and Exchange Commission) reporting data, or EPA (Environmental Protection Agency) reporting data.

10. The method of claim 1, wherein the contribution mapping includes higher numerical values correlating to higher relative contributions and lower numerical values correlating to lower relative contributions.

11. A hardware storage device for use in a computer architecture, for implementing a method for using weighted links between enterprise resource planning data of an organization and business capabilities of the organization to facilitate making business related decisions based on how a specified business capability contributes to a specified portion of enterprise resource planning data, the hardware storage device having computer-executable instructions stored thereon that, when executed at a processor, cause the computer architecture to implement the method, including the following:

accessing a schema-based model that models a business architecture for the organization, the schema-based model modeling a plurality of interrelated business capabilities for the organization at a specified level of detail, each business capability representing a different type of work the organization performs;

accessing a schema-based representation of enterprise resource planning data for the organization, the enterprise resource planning data formatted in a generic format for purposes of report generation related to industrial classification and/or regulatory compliance, the enterprise resource planning data lacking organization-specific formatting, the enterprise resource planning data including a plurality of different portions, each different portion relating to a different type of business-related function of the organization;

identifying an plurality of express schema based links between the enterprise resource planning data and the plurality of interrelated business capabilities, each schema based-link linking a particular business capability to a corresponding portion of the enterprise resource planning data that is transformed during a business process involving the particular business capability, each schema based-link is weighted by including in each express schema-based link a corresponding property value that is indicative of a relative contribution of the particular business capability to the corresponding portion of the enterprise resource planning data;

based on the identified plurality of express schema-based links and the corresponding property values weighting each link, generating a contribution mapping, the contribution mapping reflecting the relative contribution that each corresponding business capability makes to each of the plurality of different portions of enterprise resource planning data;

providing the contribution mapping which is usable for making a business related decision based on the contribution mapping; and making a business related decision with respect to a particular portion of enterprise resource planning data based on the provided contribution mapping, wherein the decision is made by an act of aligning the goals of an organizational project with the relative contributions of the business capabilities.

12. The hardware storage device as recited in claim 11, wherein computer executable instructions that, when executed, cause the computer architecture to access a schema-based model that models a business architecture for the organization comprise computer-executable instructions that, when executed, cause the computer architecture to access a business capability model, the capability model defining service level expectations that can contribute to enterprise resource planning data.

13. The hardware storage device as recited in claim 11, wherein computer executable instructions that, when executed, cause the computer architecture to access a schema-based representation of a portion of enterprise resource planning data for the organization comprise computer executable instructions that, when executed, cause the computer architecture to access schematized financial data for the organization.

14. The hardware storage device as recited in claim 11, wherein computer executable instructions that, when executed, cause the computer architecture to access a schema-based representation of a portion of enterprise resource planning data for the organization comprise computer executable instructions that, when executed, cause the computer architecture to access enterprise resource planning data formatted for inclusion in a report to a governmental agency.

15. The hardware storage device as recited in claim 11, wherein computer executable instructions that, when executed, cause the computer architecture to access a schema-based representation of a portion of enterprise resource planning data for the organization comprise computer executable instructions that, when executed, cause the computer architecture to access schematized data from a database of an enterprise resource planning system for the organization.

16. The hardware storage device as recited in claim 11, wherein computer executable instructions that, when executed, cause the computer architecture to make-provide the contribution mapping which is usable for making a business related decision based on the contribution mapping comprise computer-executable instructions that when executed cause the computer architecture to make-provide the contribution mapping which is usable for making a decision with respect to one or more of: a vertical industry strategy for the organization and a strategic direction for the organization.

17. A networked computer system for an organization, the networked computer system including:

one or more processors;

system memory;

one or more physical storage media, the physical storage media having stored thereon computer-executable instructions representing:

a plurality of software modules for implementing business functionality of the organization;

a database that stores data in a central location accessible to each of the plurality of software modules such that the plurality of software modules can interoperate based on the stored data; and a data aggregator, the data aggregator configured to format data from the database into one or more data formats used by the organization, including formatting financial data for financial reporting; and the physical storage media also having stored thereon one or more other software modules configured to implement a method comprising:

accessing a schema-based model that models a business architecture for the organization, the schema based model modeling a plurality of interrelated business capabilities for the organization at a specified level of detail, each business capability representing a different type of work the organization performs;

accessing a schema-based representation of enterprise resource planning data for the organization, the enterprise resource planning data formatted in a generic format for purposes of report generation related to industrial classification and/or regulatory compliance, the enterprise resource planning data lacking organization-specific formatting, the enterprise resource planning data including a plurality of different portions, each different portion relating to a different type of business-related function of the organization;

identifying a plurality of express schema-based links between the enterprise resource planning data and the plurality of interrelated business capabilities, each schema based-link linking a particular business capability to a corresponding portion of the enterprise resource planning data that is transformed during a business process involving the particular business capability, each schema based-link is weight by including in each express schema-based link a corresponding property value that is indicative of a relative contribution of the particular business capability to the corresponding portion of the enterprise resource planning data; and based on the identified plurality of express schema-based links and the corresponding property values weighting each link, generating a contribution mapping, the contribution mapping reflecting the relative contribution that each of the plurality of interrelated business capabilities makes to each of the plurality of different portions of the enterprise resource planning data; and making a business related decision with respect to a particular portion of enterprise resource planning data based on the contribution mapping, wherein the decision is made by aligning the goals of an organizational project with the relative contributions of the business capabilities.

* * * * *